Figure 1:
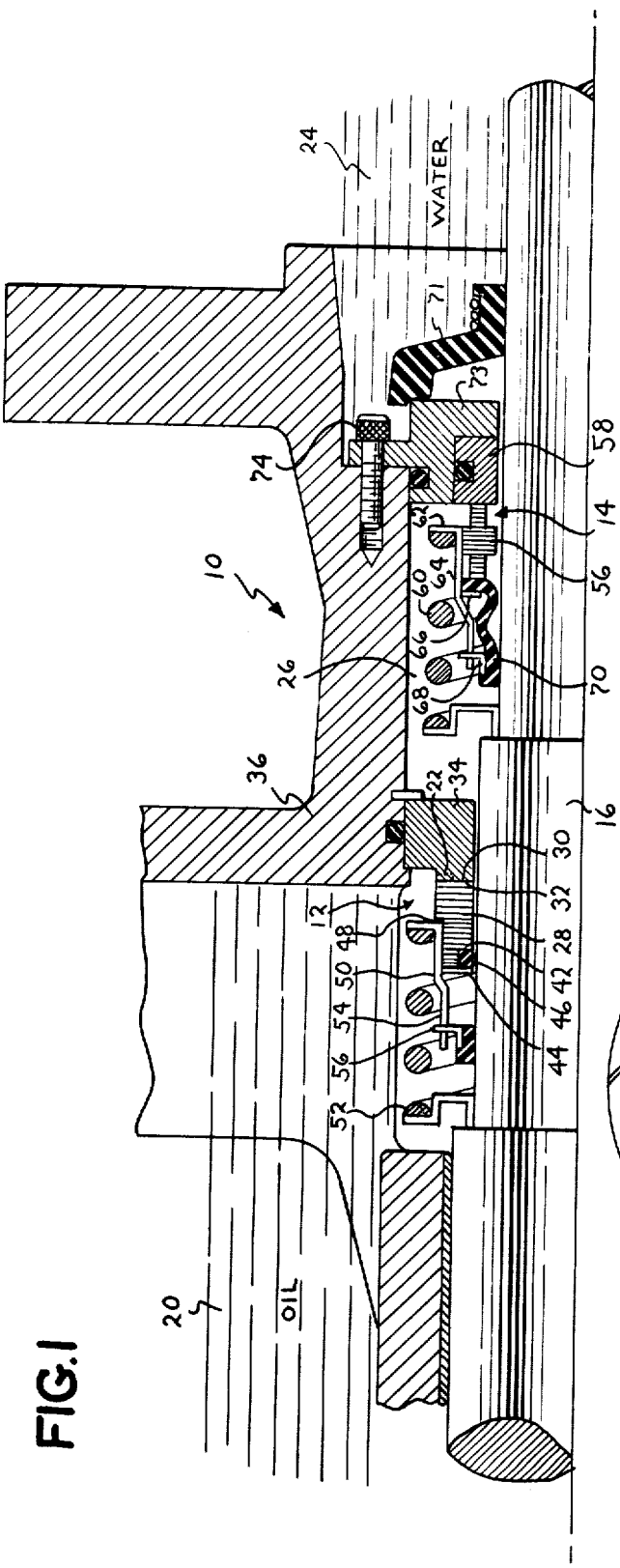

United States Patent [19]
McHugh

[11] 3,894,741
[45] July 15, 1975

[54] SELF-PRESSURIZING SEAL FOR ROTARY SHAFTS

[75] Inventor: James Dennis McHugh, Santa Clara, Calif.

[73] Assignee: General Electric Company, Schenectady, N.Y.

[22] Filed: May 16, 1973

[21] Appl. No.: 361,368

Related U.S. Application Data

[62] Division of Ser. No. 132,485, April 8, 1971, Pat. No. 3,704,019.

[52] U.S. Cl. .................. 277/27; 277/59; 277/96 A; 277/67
[51] Int. Cl. ............................................. F16j 15/16
[58] Field of Search .......... 277/2, 3, 25, 27, 28, 29, 277/59, 96 A; 73/46

[56] References Cited
UNITED STATES PATENTS

| | | | |
|---|---|---|---|
| 2,631,050 | 3/1953 | Haeberlein | 277/28 X |
| 2,999,702 | 9/1961 | Dunn et al. | 277/28 |
| 3,679,217 | 7/1972 | Lesieki | 277/3 |
| 3,701,535 | 10/1972 | Born et al. | 277/27 X |

Primary Examiner—Richard E. Aegerter
Assistant Examiner—L. Footland
Attorney, Agent, or Firm—Vale P. Myles

[57] ABSTRACT

A self-pressurizing shaft seal for an oil filled submersible motor is characterized by an inboard sprial grooved face seal and an outboard conventional face seal disposed in series relationship along the motor shaft. During operation, the inboard spiral grooved face seal pumps oil from the motor interior into a substantially confined zone between the seals to increase the oil pressure at the outboard fac seal without the necessity for structurally strengthening the entire motor housing. Also disclosed is the disposition of a shoulder on the spiral grooved seal runner face remote from the pumping interface to permit the oil pressure within the confined zone to hydraulicly increase the axial force upon the runner thereby increasing the pumping pressure of the spiral grooved seal in boot strap fashion. Other disclosed seals contain means for measuring the pressure within the confined zone to actuate remote signaling devices upon a failure of the outboard seal as well as spiral grooved face seals having valving means to alter the pumping rate of the inboard seal upon a loss of pressure in the confined zone between seals.

3 Claims, 7 Drawing Figures

3,894,741

PATENTED JUL 15 1975

SHEET 1

SELF-PRESSURIZING SEAL FOR ROTARY SHAFTS

This is a division of application Ser. No. 132,485 filed Apr. 8, 1971, now U.S. Pat. No. 3,704,019, issued Nov. 28, 1972.

This invention relates to a shaft seal for a rotatable machine and, more particularly, to a shaft seal wherein a high pressure zone of sealing fluid is formed between a spiral grooved face seal and a conventional face seal to inhibit ingress of contaminating fluid into the machine.

One of the major factors limiting the life of submersible motors is water in-pumping at the shaft seal produced by a slight eccentricity in the face seal customarily employed to assure minimum leakage at the shaft. ALthough water in-pumping can be overcome by substantially increasing the pressure differential between the sealing fluid, e.g., oil, typically contained within the motor and the ambient water, higher pressure differentials necessarily require reinforcement of the motor housing as well as substantial ]lterations in the spring biased diaphragm customarily utilized 3c6 produce the oil/water pressure differential.

Because of the difficulties associated with increasing the oil pressure within the motor, a number of different seal configurations have been proposed to inhibit in-pumping notwithstanding a low oil/water pressure differential. For example, rotor shafts have been sealed utilizing an external pump to produce yigh and low pressures within sealing chambers situated at axially displaced locations along the shaft. Similarly, it yas heretofore been proposed that the shaft of a centrifugal pump be sealed utilizing the rotary speed of the shaft to pump oil from an axially outboard location to an inboard seal to restrict gas leakage from the pump. I also have proposed in my co-pending patent application, Ser. No. 47,842, filed June 19, 1970, utilization of a spiral grooved face seal having deep helical grooves to increase the pressure at the seal interface without increasing the outpumping rate of oil from the motor. While all these designs have certain advantages, there still remains a need for seals of different designs with differing capabilites.

It is therefore an object of this invention to provide a novel self-pressurizing seal characterized by low leakage.

It is also an object of this invention to provide a seal adaptable to monitoring at an external location to assure proper seal functioning.

It is a further object of this invention to provide a self-pressurizing seal wherein the pressure of the sealing liquid within the seal is employed to augment the mechanical bias of the seal thereby maximizing the obtainable pressure from the seal without extensive wear of the seal during startup.

It is a still further object of this invention to provide a self-pressurizing seal wherein automatic closure of the seal is effected upon a reduction in seal pressure.

These and other objects of this invention generally are achieved by a self-pressurizing seal for a rotatable machine characterized by an inboard pumping seal having an annular running member mounted upon a rotatable shaft in juxtaposition with an annular co-planar stationary member. At least one of the juxtaposed members is provided with spiral grooves extending from the perimeter of the member to a land along the planar face of the member to pump sealing fluid from the rotatable machine into a substantially confined zone. The pumping action of the inboard seal increases the pressure of the sealing fluid within the zone relative to the sealing fluid pressure within the machine and conventional face seal means are disposed along the shaft at an axially outboard location (relative to the inboard pumping seal) to restrict the flow of sealing fluid from the high pressure zone into the ambient water. Because sealing fluid at relatively high pressure is situated only within a zone intermediate the axially displaced face seals, ingress of water into the motor is inhibited without structural reinforcement of the entire motor housing and without subjecting the necessary flexible oil expansion system to large pressure difference.

Figure 2:
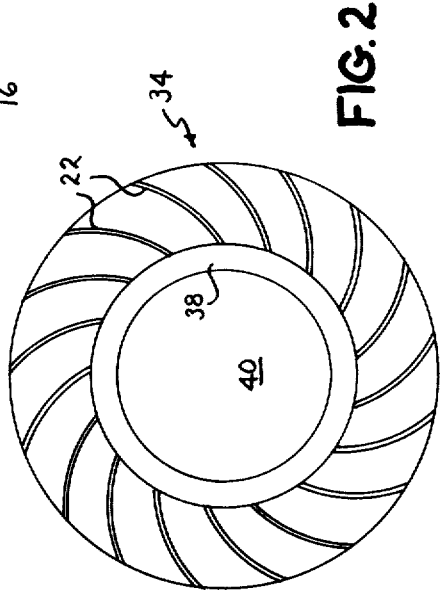
Figures 3, 4:
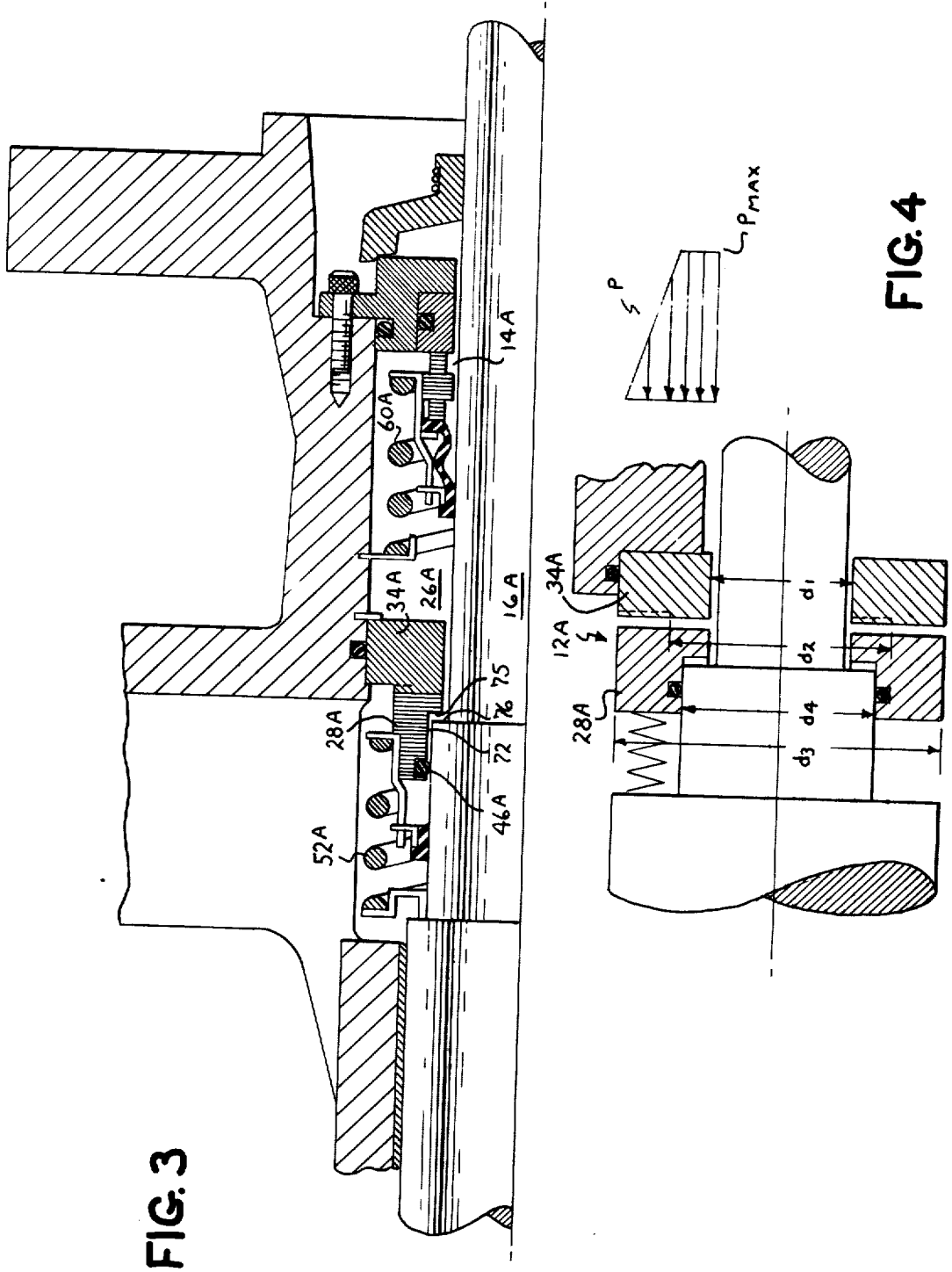
Figure 5:
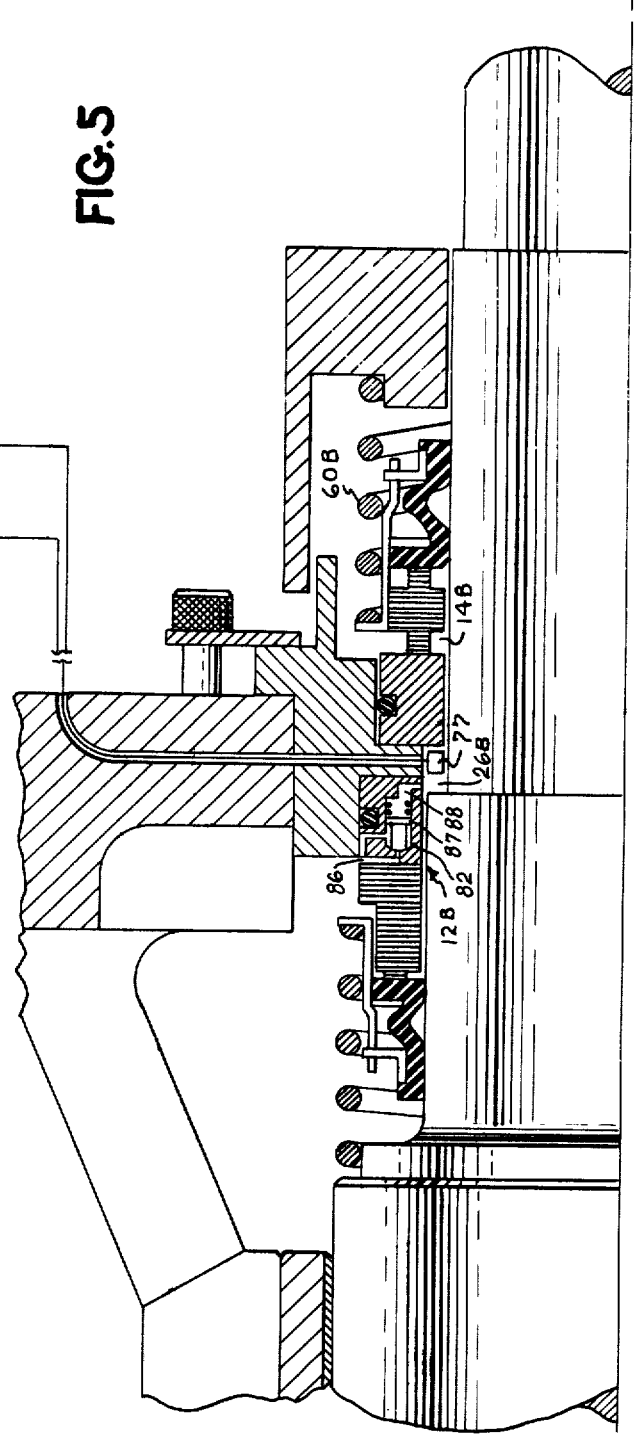
Figure 6:
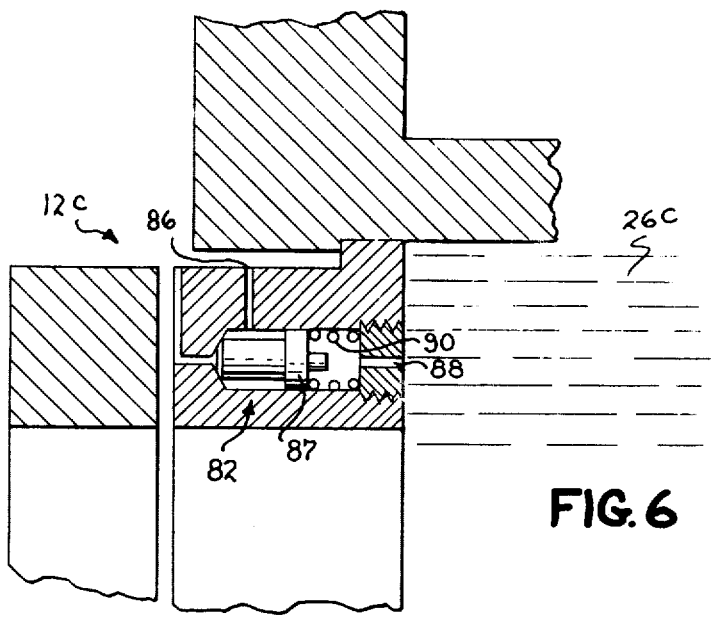
Figure 7:
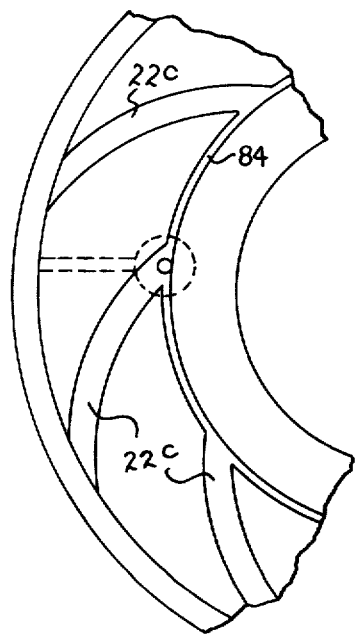

Although the features of this invention are defined with particularity in the appended claims, a more complete understanding of the invention may be obtained from the following detailed description of various specific embodiments when taken in conjunction with the appended drawings wherein:

FIG. 1 is an enlarged sectional view of a self-pressurizing seal in accordance with this invention, FIG. 2 is a plan view of one member of the inboard face seal illustrating the disposition of spiral grooves therein, FIG. 3 is a sectional view of a self-pressurizing seal wherein the hydraulic pressure of the oil within the seal is employed to increase the obtainable seal pressure, FIG. 4 is an enlarged sectional view illustrating the force distribution along the spiral grooved seal of FIG. 3, FIG. 5 is an alternate seal configuration illustrating a seal monitoring device in accordance with this invention, FIG. 6 is a sectional view of a spiral grooved seal wherein the outpumping rate of the seal is reduced upon a reduction in the outboard seal pressure, and FIG. 7 is a plan view of the stationary member forming the seal of FIG. 6.

A self-pressurizing seal 10 in accordance with this invention is illustrated in FIG. 1 and generally includes an inboard spiral grooved face seal 12 and an outboard face seal 14 disposed in tandem upon shaft 16 of a dynamoelectric machine, e.g., the pump motor such as is described in U.S. Pat. No. 2,790,916, issued Apr. 30, 1957 to M. B. Hinman (the entire disclosure of which patent is incorporated herein by reference). Typically, the pump motor contains a sealing fluid, e.g., transformer oil 20, biased by a flexible diaphragm to increase the pressure of the oil approximately 5 psi relative to the water 24 which forms the ambient environment for the motor during operation. The oil within the motor is in communication with the radially outer surface of inboard seal 12 and is pumped by the spiral grooves of the inboard face seal into substantially closed annular oil chamber 26 thereby increasing the oil pressure of the chamber relative to the oil pressure within the pump motor.

Spiral groove face seal 12 generally is characterized by an annular carbon runner 28 mounted upon shaft 16 with planar face 30 of the runner being disposed in a confronting attitude with planar face 32 of ceramic stationary member 34 fixedly secured to pump motor housing 36. One of the planar faces of face seal 12, illustrated in FIG. 1 as face 32 of stationary member 34, has spiral grooves 22 therein to pump oil from the motor upon rotation of runner 28 relative to stationary member 34. The grooves, shown more clearly in FIG. 2, have a geometric configuration and density dependent upon the quantity of pumping desired by the face seal (as will be more fully explained hereinafter) and desirably extend radially from the outer circumferential edge of annular stationary member 34 to an annular land 38 separating the grooves from central aperture 40 extending axially through the member. In the event a failure of outboard face seal 14 should necessitate a shutdown of the motor, land 38 advantageously functions to block back flow of water through spiral grooved face seal 12.

Returning again to FIG. 1, the face of carbon runner 28 remote from planar face 30 is notched to form a lower shoulder 42 which, in association with backing plate 44, serves to house O-Ring 46 sealing the carbon runner to shaft 16. A second shoulder 48 also is formed along the radially outer face of carbon runner 28 to seat a generally L-shaped brass ferrule 50 biased against the runner by spring 52. To permit axial movement of the ferrule along shaft 16 while restricting movement of the ferrule in a plane perpendicular to the shaft, elongated body 54 of the ferrule is slidably engaged within a guide 56 fixedly secured to the motor shaft.

Outboard face seal 14 is conventional in design and is mounted in tandem with spiral grooved face seal 12 so that the pressure of the oil within chamber 26 tends to close carbon runner 56 upon confronting ceramic stationary member 58. A biasing spring 60 augments the oil pressure tending to close the face seal by providing an axial force against upper extension 62 of ferrule 64 to drive inwardly extending backing plate 66 toward carbon runner 56. The edge of ferrule 64 proximate spiral grooved face seal 12 extends through guide 68 to limit the axial movement of the ferrule while sealing of the runner to the shaft is accomplished by a flexible bellows 70 fixedly secured between the shaft and the overlying ferrule.

To inhibit ingress of solid contamination into the motor, a sand slinger 71 is secured to motor shaft 16 at an axial location to shroud the radially outer edge of outboard seal carrier 73. The seal carrier is fixedly mounted to the motor housing 36 by bolts 74 passing through suitable apertures in the outer flange of the seal carrier while a radially inner notch in the seal carrier serves as a seat for stationary member 58 of face seal 14.

During operation of the motor, the rotary motion of carbon runner 28 relative to spiral grooved stationary member 34 pumps oil from the motor housing into annular oil chamber 26 to increase the oil pressure within the chamber to a predetermined level dependent primarily upon the anticipated water inpumping force at outboard face seal 14 resulting from eccentricity in the outboard seal. This predetermined pressure level can be calculated (in accordance with the teachings of an article entitled "Inward Pumping in Mechanical Face Seals," by J. A. Findlay, presented as paper No. 68 at the Lub 2 ASME-ASIE Lubrication Conference, Atlantic City, N.J., Oct. 1–10, 1968,) from the formula:

$$\frac{\Delta p}{e} = \frac{3\epsilon \cos\alpha \cdot \mu\omega (R_o - R_o)}{h^2 (1+1.5\epsilon^2)} \quad (1)$$

wherein $\frac{\Delta p}{e}$ is the required oil pressure in lbs./in.$^2$ for each inch eccentricity (e) of outboard face seal 14, ε is the maximum tilt contemplated for face seal 14, ω is the shaft speed in radians per second, $R_o - R_i$ is the radial span of the juxtaposed faces forming seal 14 in inches, cosα is the maximum misalignment contemplated for face seal 14, μ is the viscosity of the water presumed to penetrate the seal interface, in lb-sec./in.$^2$, h is the average oil film thickness between faces of the seal in inches.

Typically, an oil pressure increase of approximately 4,000 lbs./sq.in. is required to compensate for each inch of shaft eccentricity to assure zero inpumping at the outboard face seal.

Although the seal eccentricity can very dependent upon such factors as the amount of shaft runout under load and speed, the out-of-roundness of the carbon washer, etc., the total eccentricity generally can be estimated with a high degree of reliability for any given manufacturing procedure. Thus, if manufacturing experience has indicated that an eccentricity of approximately 0.010 inch normally is not exceeded on fabricated face seals, the pressure required for chamber 26 to prevent water impumping is calculated by multiplying the maximum observed eccentricity by the pressure per inch of face seal eccentricity as calculated by the foregoing Findlay equation, e.g., for an empirically determined maximum eccentricity of approximately 0.010 inch and a calculated oil pressure of 4000 psi per inch eccentricity, a total pressure of 40 psi is required in oil chamber 26 to inhibit inpumping.

The outpumping rate at outboard face seal 14 also must be considered to assure that the oil supply within the motor is not exhausted within an unduly short time in attempt to inhibit water ingress through the face seal. The outpumping rate for the outboard seal therefore is calculated, e.g., from the formula:

$$q = \frac{\Delta p \pi \, R_i h^3}{6\mu \, \Delta R} \quad (2)$$

q is the outpumping rate,

Δp is the difference in pressure across face seal 14 in psi, h is the average film thickness between juxtaposed faces of the seal in inches, $R_i$ is the radius to the inner edge of the sealing land, μ is the viscosity of oil in the seal interface in lb.sec.-/in.$_2$, and ΔR is equal to the radial span of the juxtaposed faces forming the seal in inches.

The optimum pressure for oil chamber 26 then is chosen as a compromise between the high oil pressure desired to overcome inpumping of water into the motor and the low oil pressure desired to limit the oil outpumping rate at the outboard face seal.

Once the pressure desired for annular oil chamber 26 has been chosen, the geometric configuration of inboard spiral groove face seal 12 required to produce this pressure can be determined in accordance with the teachings of E. A. Muijderman in an article entitled SPIRAL GROOVE BEARINGS published 1966 by Philips Technical Library. One spiral grooved face seal configuration found suitable for a 12 inch submersible motor having a 2 inch rotatable shaft was characterized by 10 equally spaced grooves notched to a depth of 0.0013 inch and extending at a sprial angle of 15° with a groove land to width ratio of 1. The inner and outer diameters of the seal measured 1.87 inches and 2.37 inches, respectively, while the groove inner diameter measured 1.95 inches. With the foregoing seal rotating at a speed of 30 revolutions per second, a maximum pressure of 67.5 psi was observed in annular oil chamber 26.

FIG. 3 illustrates an improved embodiment of this invention whereby the force of the sprial grooved face seal biasing spring can be reduced without a reduction in the pressure obtainable from the face seal. To achieve this result, a shoulder 72 is notched in carbon runner 28A at an outboard location relative to O-Ring 46A thereby permitting pressurized oil within annular oil chamber 26A to communicate with face 75 and hydraulically drive runner 28A axially towards mutual contact with stationary member 34A as the pressure within the oil chamber increases. Although a shoulder 76 is provided in shaft 16A to seal notched runner 28A and the position of the back support for spring 60A has been changed slightly, the self-pressurizing face seal of FIG. 3 otherwie is substantially identical to the face seal illustrated in FIG. 1. The increased axial force upon runner 28A, however, resulting from hydraulic pressure on face 75 reduces the gap of the spiral grooved face seal tending to increase the obtainable pressure from the seal. This increased pressure, in turn, results in an increased hydraulic force upon face 75 and the pressure within annular oil chamber 26A is increased in bootstrap fashion until an equilibrium pressure is reached.

Assuming zero net flow at outboard face seal 14A, the pressure generated by spiral grooved face seal 12A (illustrated by pressure diagram P in FIG. 4) increases approximately linearly from the outer periphery of stationary member 34A to the inner extent of the grooves in the stationary member, i.e., from $d_3$ to $d_2$ with the pressure along the ungrooved portion of the seal interface, i.e., from $d_2$ to $d_1$, remaining constant at $P_{MAX}$. For simplicity, the average pressure acting over the area between $d_2$ and $d_3$ may be assumed equal to ½ $P_{MAX}$. The maximum pressure at equilibrium therefore can be estimated from the approximate formula:

$$P_{MAX} = \frac{F_s}{\frac{\pi}{4}\left[\frac{(d_2^2 + d_3^2)}{2} - d_4^2\right]} \quad (3)$$

wherein $F_s$ is the axial load upon the seal produced by spring 52A in pounds, $d_2$ is the internal diameter of the spiral grooved annular portion of the face seal, $d_3$ is the external diameter of the spiral grooved annular portion of the face seal, and $d_4$ is the diameter of hydraulic shoulder 72 formed in carbon runner 28A.

One bootstrap seal having a seal inner diameter (i.e., $d_1$) of 1.87 inches, a groove inner diameter (i.e., $d_2$) of 1.95 inches, a seal outside diameter (i.e., $d_3$) of 2.374 inches and a seal balance diameter (i.e., $d_4$) of 2.0 inches produced a hydraulic load of 28.7 lbs. upon the face seal in addition to a bias of 42 lbs. provided by spring 52A for a total face seal axial load of approximately 70.7 lbs.. The spiral grooved runner of the face seal contained 15 equally spaced grooves disposed at a spiral angle of 15° and the runner was rotated at a speed of approximately 30 revolutions per second.

When the required pressure for the intermediate oil chambers is low, e.g., approximately 20 psi, the outboard face seal can be disposed in a back-to-back configuration with the inboard spiral grooved face seal as illustrated in FIG. 5. The pressure within oil chamber 26B then applies an axial force upon outboard face seal 14B tending to separate the confronting faces of the seal requiring a biasing spring 60B having an axial force sufficient to overcome the hyraulic pressure within chamber 26B to maintain the desired outboard face seal opening during operation. If a failure of pressure should occur within chamber 26B, the hyraulic force tending to maintain the outboard seal open would be removed and biasing spring 60B would tend to close the faces of the outboard seal inhibiting ingress of water into the motor. When the back-to-back seal arrangement is utilized with relatively high seal pressures, e.g., pressures of approximately 60 psi, care must be taken to choose a biasing spring 60B having sufficient force to inhibit excessive outpumping of oil through the outboard face seal.

A major feature of this invention is the ability to monitor seal operation at an external location by the disposition of a pressure transducer 77 within oil chamber 26B as illustrated in FIG. 5. The pressure transducer is connected in series with an alarm 78 and a voltage source, e.g., a transformer 80 having a primary winding 80A connected across the motor energization leads (not shown), and functions to close the series circuit upon a reduction in pressure within oil chamber 26B below a predetermined minimum. Alarm 78 then is sounded permitting shutdown and removal of the motor from a submerged location prior to permanent damage of the motor interior by water seepage therein. Should the pressure drop in chamber 26B be produced by a failure of outboard face seal 14b, seepage of water through spiral grooved face seal 12b during shutdown is inhibited by annular land 38 of the face seal. To effectively function as a flow restricter during motor shutdown resulting from failure of outboard seal 14B, the annular land desirably should have a radial span of at least 0.04 inches.

A self-contained motor protective device is illustrated in FIGS. 5, 6 and 7 wherein a spring loaded pressure relief valve 82 is employed to alter the operation of inboard spiral grooved seal 12C from a full film to a solid-solid contacting mode in the event of failure of the outboard seal. Relief valve 82 functions to restrict the flow of oil from an annular groove 84 situated at the radially inner terminus of the spiral grooves 22C to a bypass port 86 during normal operation of the self-pressurizing seal. If the ouboard face seal should fail during motor operation reducing the pressure within oil chamber 26C (or 26B in FIG. 5) confined between the face seals, the hydraulic pressure on piston 87 of valve 82 communicated to the valve through axial aperture 88 also drops and the relatively higher pressure of the oil within annular groove 84 overcomes the 2ias 6f spring 90 to relieve the pressure at the seal interface through bypass port 86.

With valve 82 open, the operation of spiral grooved face seal 12C shifts from a conventional thick film operation, i.e., a flim in excess of approximately 100 microinches typically produced by a conventional groove depth of 1000 to 1500 microinches, to a solid-solid contacting mode, i.e., a film width below approximately 50 microinches, substantially limiting the outpumping rate of the spiral grooved face seal. Thus, a portion of the oil pumped by the spiral grooved face seal is valved back to the suction side of the face seal thereby reducing both the maximum pressure generated between faces of the spiral grooved face seal and the quantity of oil pumped into oil chamber 26C.

It will be appreciated that the spiral groove face seal will tend to close, even without operation of relief valve 82, upon failure of the outboard seal because of increased maximum pressure at the spiral groove seal interface resulting in a changed oil distribution at the seal interface. If the maximum pressure required by the seal under conditions of leakage exceeds the maximum generating capacity of the seal, the seal will inherently change from a full film mode to a solid-solid contact mode to reduce the outpumping rate. Thus, by careful choice of spiral groove design, e.g., spiral groove width, depth and length, a seal can be fabricated wherein the desired pressre will be produced with outboard seal 14C functioning properly in a full film mode while a substantially reduced outpumping rate is produced upon failure of the outboard seal.

The previously cited formula (3) for estimating the maximum pressure rise clearly illustrates the effect of the shoulder $d_4$ of FIG. 4 upon the pressure created. Formula (3) assumed an average pressure $P$MAX/2 over that portion of the seal interface where the pressure changes. An alternate, theoretically exact formula for calculating the maximum pressure rise may be obtained by integrating the assumed linear pressure rise over the areas between diameters $d_2$ and $d_3$ of FIG. 4. If the seal diameter $d_4$ is equal to the diameter $d_1$, no shaft shoulder exists and the formula for calculating pressure rise becomes:

$$\frac{P_{MAX}}{\frac{F_s}{\frac{\pi}{4}d_3^2}} = \frac{3}{1 + \frac{d_2}{d_3}\left(1 + \frac{d_2}{d_3}\right) - 3\left(\frac{d_1}{d_3}\right)^2}$$

wherein $P_{MAX}$ is the maximum pressure generated by the seal in psi in a full film mode with zero leakage, $F_s$ is the total force applied to the seal by the biasing spring in pounds, $d_1$ is the span from the radially inner face of the face seal to the shaft axis, $d_2$ is the span from the radially inward end of the spiral grooves to the shaft axis, and $d_3$ is the span from the radially outer periphery of the spiral grooves to the shaft axis, The ratio of the maximum pressure developed at the pumping seal with leakage at ouboard seal 14 interface relative to the maximum pressure capable of being developed by the seal with zero leakage then can be calculated from the formula:

$$\frac{P_{MAX}, \text{ with leakage}}{P_{MAX}, \text{ no leakage}} = \frac{1 + \frac{d_2}{d_3}\left(1 + \frac{d_2}{d_3}\right) - 3\left(\frac{d_1}{d_3}\right)^2}{1 + \frac{d_2}{d_3}\left(1 - \frac{d_1}{d_3}\right) - \left(\frac{d_1}{d_3}\right)^2}$$

From this ratio, the maximum pressure capable of being developed by seal 12 with no restriction in leakage at the outboard seal can be calculated to provide an indication of film thickness arising from the pressure increase. When the calculated maximum film pressure under leakage conditions exceeds the maximum generating capability of the seal (as can be calculated from the heretofore cited Muijderman publication), te seal operation changes from a full film mode to a solid-solid contact mode upon failure of the outoard seal.

It should be appreciated that very shallow (e.g. 50 microinches) or very deep (e.g., 20,000 microinches as described in my heretofore cited patent application, Ser. No. 47,824) grooves can be utilized for the inboard face seal to reduce outpumping upon failure of the outboard seal. However, because the pressures produced by these face seals during normal operation is difficult to predict due to variations in fluid viscosity at the seal interface, such seals generally ae not recommended for the inboard face seal.

What I claim as new and desire to secure by Letters Patent of the United States of America is:

1. A shaft seal for a rotatable machine to inhibit ingress of ambient fluid into said machine, said seal comprising a spiral grooved face seal disposed at an inboard location along said shaft for pumping sealing fluid from said machine into a substantially confined zone to increase the sealing fluid pressure within said machine, said spiral grooved face seal comprising coaxial rotary and stationary members juxtaposed in a co-planar attitude, at least one of said members being axially slidable along said shaft to vary the span between said members, mechanical means biasing said axially slidable member toward said stationary member, a shoulder notched within said axially slidable member face remote from said stationary member, said should being in communication with the sealing fluid of said confined zone to bias said axially movable member toward said stationary member of said spiral grooved face seal with increased sealing fluid pressure in said confined zone, face seal means disposed at an axially outboard location upon said rotatable shaft to restrict the flow of sealing fluid from said confined zone, means for monitoring the pressure within said confined zone, a pressure responsive valve means mounted in a bypass port communicating the region between said spiral grooved face seal members to said motor interior, and resilient biasing means operable to actuate said valve means to close the bypass port responsive to a predetermined value of pressure being attained in said confined zone, said valve means being further operable in response to a reduction in the pressure within said confined zone below a predetermined value to open said bypass port.

2. A shaft seal for a rotatable machine comprising means disposed at an inboard location along said shaft for pumping sealing fluid from the interior of said machine into a substantially confined zone, face seal means disposed at an axially outboard location upon said rotatable shaft to restrict the exhaust of sealing fluid from said confined zone, said inboard pumping means being a face seal characterized by two confronting members, one of said members having spiral grooves extending from the periphery of said member to an annular groove within the face of said member, and valve means mounted in a bypass port communicating between said annular groove and the suction side of said pumping means to control the flow of sealing fluid therebetween, said valve means being operable in response to variations in the pressure within said confined zone for varying the pumping rate of fluid into the confined zone by said pumping means from a maximum when the valve is closed to a minimum when the valve is opened responsive to a reduction of pressure within said confined zone below a predetermined value.

3. A shaft seal for a rotatable machine according to claim 2 wherein said valve means is a spring loaded valve having a piston slidably mounted in a cylinder one end of which is in communication with said confined zone, the hydraulic pressure of sealing fluid within said confined zone being effective to apply a force through the piston to said valve biasing it to move in a first direction to close the valve, the hydraulic force of sealing fluid within said annular groove being effective to apply force to said valve biasing it in a second direction to open the valve.

* * * * *